(12) United States Patent
Cao et al.

(10) Patent No.: US 8,843,394 B2
(45) Date of Patent: Sep. 23, 2014

(54) MAPPING IDENTIFIERS

(75) Inventors: Fei Cao, Issaquah, WA (US); Shaoyu Zhou, Issaquah, WA (US); Siddhartha Roy, Kirkland, WA (US); Michael Elizarov, Sammash, WA (US); Zhuoqing Wu, Redmond, WA (US); James Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 12/818,349

(22) Filed: Jun. 18, 2010

(65) Prior Publication Data

US 2011/0313847 A1 Dec. 22, 2011

(51) Int. Cl.
*G06Q 30/00* (2012.01)
*G06Q 30/02* (2012.01)

(52) U.S. Cl.
CPC ............ *G06Q 30/02* (2013.01); *G06Q 30/0241* (2013.01); *G06Q 30/0244* (2013.01); *G06Q 30/0255* (2013.01)
USPC .................... 705/14.53; 705/14.49; 705/14.66

(58) Field of Classification Search
CPC ........... H04L 29/8072; H04L 29/8081; G06Q 30/0241; G06Q 30/0244; G06Q 30/0246; G06Q 30/0251; G06Q 30/0255; G06Q 30/0269; G06Q 30/0277
USPC ........... 709/201–203; 705/14.4, 14.49, 14.53, 705/14.66, 14.73
See application file for complete search history.

(56) References Cited

U.S. PATENT DOCUMENTS

| | | | |
|---|---|---|---|
| 6,185,615 B1 * | 2/2001 | Labiaga et al. | 709/224 |
| 6,202,062 B1 | 3/2001 | Cameron et al. | |
| 7,606,897 B2 * | 10/2009 | Izrailevsky et al. | 709/224 |
| 7,698,422 B2 * | 4/2010 | Vanderhook et al. | 709/224 |
| 7,840,523 B2 * | 11/2010 | Aaronson | 706/62 |
| 7,853,474 B2 * | 12/2010 | Ullah | 705/7.31 |
| 7,937,288 B2 * | 5/2011 | Blaser et al. | 705/14.49 |
| 8,160,985 B2 * | 4/2012 | Hino | 706/46 |
| 8,285,837 B2 * | 10/2012 | Sanford et al. | 709/224 |
| 8,321,494 B2 * | 11/2012 | Ferguson et al. | 709/202 |
| 2002/0133412 A1 * | 9/2002 | Oliver et al. | 705/26 |
| 2005/0131762 A1 * | 6/2005 | Bharat et al. | 705/14 |

(Continued)

OTHER PUBLICATIONS

Suneetha, Krishnamoorthi. Identifying User Behavior by Analyzing Web Server Access Log File, International Journal of Computer Science and Network Security, vol. 9, No. 4, pp. 327-332 (Apr. 2009).*

(Continued)

*Primary Examiner* — Bennett Sigmond
(74) *Attorney, Agent, or Firm* — Joann Dewey; Doug Barker; Micky Minhas

(57) ABSTRACT

Systems and methods for mapping identifiers are provided. Activity logs illustrate activities and/or events associated with a plurality of identifiers. The identifiers may be registered identifiers, unregistered identifiers, or a combination thereof. When at least two identifiers share a linking attribute, the at least two identifiers may be mapped to one another, along with information associated therewith (if any) such as a user profile. Each subsequent line of an activity line may also be mapped to the identifiers of the initial single line when a linking attribute or an overlapping identifier is present. A number of identifiers associated with each other may be increased by mapping identifiers and, thus, a targeted audience for a customized advertisement may, in turn, be increased.

17 Claims, 4 Drawing Sheets

(56) References Cited

U.S. PATENT DOCUMENTS

| | | | |
|---|---|---|---|
| 2005/0216338 A1* | 9/2005 | Tseng et al. | 705/14 |
| 2006/0031719 A1* | 2/2006 | Bower et al. | 714/39 |
| 2007/0271317 A1* | 11/2007 | Carmel | 707/204 |
| 2008/0097805 A1* | 4/2008 | Wells | 705/7 |
| 2008/0109307 A1* | 5/2008 | Ullah | 705/14 |
| 2009/0063268 A1* | 3/2009 | Burgess et al. | 705/14 |
| 2009/0119062 A1* | 5/2009 | Owens et al. | 702/176 |
| 2009/0240569 A1 | 9/2009 | Ramer | |
| 2009/0271514 A1 | 10/2009 | Thomas | |
| 2011/0093334 A1* | 4/2011 | Wood | 705/14.53 |
| 2011/0161159 A1* | 6/2011 | Tekiela et al. | 705/14.41 |

OTHER PUBLICATIONS

Inbarani, et al., Rough set based Feature Selection for Web Usage Mining, published at the International Conference on Computational Intelligence and Multimedia Applications in Dec. 2007, vol. 1, pp. 33-38.*

Tanasa, Trousse, Advanced Data Preprocessing for Intersites Web Usage Mining, IEEE Intelligent Systems, Mar./Apr. 2004 Edition, pp. 59-65.*

Szomszor, M., et al. Correlating User Profiles from Multiple Folksonomies—Published Date: 2008 http://eprints.ecs.soton.ac.uk/15414/3/ht2008-szomszor-b.pdf.

Mobasher, Banshad, et al. Discovery and Evaluation of Aggregate Usage Profiles for Web Personalization~Published Date: 2002. http://maya.cs.depaul.edu/~mobasher/papers/webkdd2000.pdf.

Feizy, Roya, et al. Distinguishing Fact and Fiction: Data Mining online Identities—Published Date: Sep. 24, 2009. http://www.informatics.sussex.ac.uk/research/groups/softsys/news/STM_Roya%20Feizy.pdf.

Lorch, Markus Transition to Role-based Assignment of Local User-Ids—Published Date: Jan. 11, 2005 http://www.fnal.gov/docs/products/voprivilege/documents/transition-to-privilege.html.

Opensolaris Managing Rule-Based Identity Mapping for Users and Groups (Task Map)—Published Date: 2005 http://dlc.sun.com/osol/docs/content/SSMBAG/manageusergroupmapstm.html.

* cited by examiner

MAPPING IDENTIFIERS

BACKGROUND

Generally, targeted advertisements based on known information and/or preferences may be presented to users that are associated with said known information that includes, but is not limited to, user profiles, search histories, search queries, page-views, and the like. While some degree of targeted advertising may be performed based on a user location (e.g., an IP address), targeted advertisements are not presented to users based on a user profile or user behavior information when the user is not associated with any user information.

Users and/or user information may be identified based on associated identifiers from activity logs utilizing, for example, registered identifiers. Examples of such registered identifiers may include a password identifier registered to a user, a device identifier of a device that is registered to a user, and the like. Identifiers that are not associated with known users, i.e., unregistered identifiers, may not be targeted by advertisers with customized advertisements since no known information is associated with the unregistered identifier and, currently, activity logs are not analyzed to reduce the number of identifiers that are not targeted by advertisers. This is frustrating to advertisers given the large quantity of non-targeted identifiers that are present in activity logs and the potential advertisement revenue that may be lost for an expanded target audience.

Additionally, users may be associated with multiple identifiers (e.g., a user may have two MSN passport accounts). Each identifier may be associated with a set of behaviors or activities. Currently, the multiple identifiers are not linked together to provide a comprehensive and accurate targeted advertisement. This is also frustrating to advertisers given that a targeted advertisement provided to a user based on an identifier may be not completely accurate since additional identifiers associated with the user are not evaluated when generating a targeted advertisement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for, among other things, mapping identifiers. Activity logs may be received that illustrate a plurality of activities/events for a plurality of identifiers. The identifiers may be registered identifiers, unregistered identifiers, or a combination thereof. When an activity log includes a combination of at least two identifiers, the identifiers may be mapped to one another. For example, user profile information or user behavior associated with a registered identifier may be associated with an unregistered identifier when the unregistered identifier is mapped to the registered identifier.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
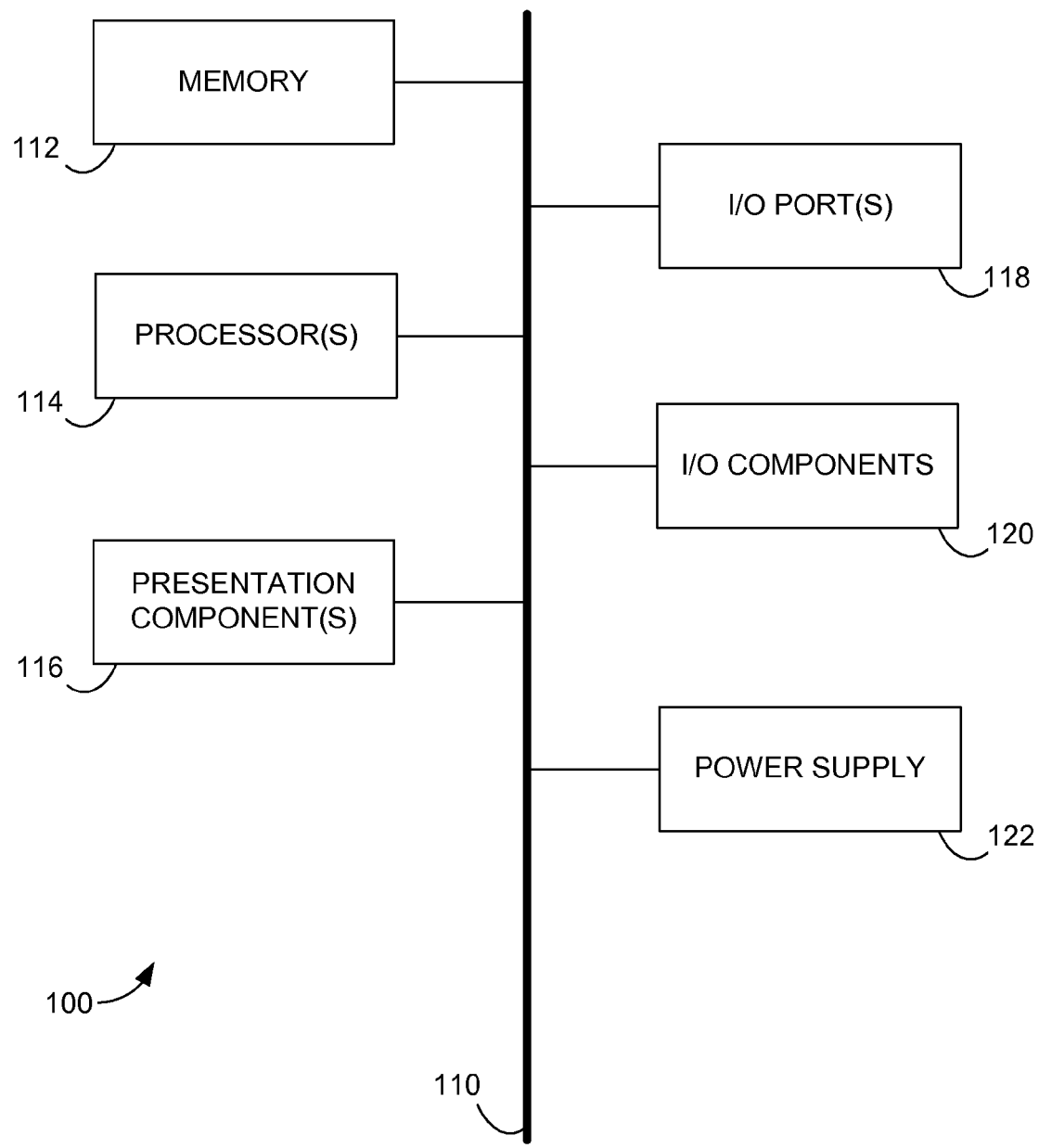
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to mapping identifiers. Activity logs may be received that illustrate a plurality of activities/events for a plurality of identifiers. The identifiers may be registered identifiers, unregistered identifiers, or a combination thereof. When an activity log includes at least two identifiers, the identifiers may be mapped to one another. For example, user profile information or user behavior associated with a registered identifier may be mapped to an unregistered identifier when the unregistered identifier is mapped to the registered identifier. Additionally, unregistered identifiers may also be mapped to other unregistered identifiers when there is at least one linking attribute. For example, the unregistered identifiers may be included on the same line of an activity log, the behaviors of the unregistered identifiers may be the same, the identifiers may appear in the same browsing session, or the like. Further, registered identifiers may also be mapped to other registered identifiers based on linking attributes. Such correlation of registered identifiers to registered identifiers may enrich a user profile and facilitate serving better targeted advertisements to the registered identifiers. Any and all such variations, and any combination thereof, are contemplated to be within the scope of embodiments of the present invention.

Accordingly, one embodiment of the present invention is directed to one or more computer-readable storage media storing computer-useable instructions that, when used by one or more computing devices, cause the one or more computing devices to perform a method for mapping identifiers. The method comprises accessing an activity log including a first single line having at least two identifiers; associating the at least two identifiers with each other; and generating a customized advertisement for the at least two identifiers.

Another embodiment of the present invention is directed to an identifier mapping system. The system comprises a computing device associated with one or more processors and one or more computer-readable storage media; a data store coupled with the computing device; and a mapping engine that maps at least two identifiers associated with a linked attribute to each other.

In yet another embodiment, the present invention is directed to one or more computer-readable storage media storing computer-useable instructions that, when used by one or more computing devices, cause the one or more computing devices to perform a method for mapping identifiers. The method comprises accessing an activity log including a first identifier and a second identifier; identifying at least one linking attribute associated with both the first identifier and the second identifier; mapping the first identifier to the second identifier; and generating a customized advertisement for one of the first or second identifiers based on the at least one linking attribute.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, input/output ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventor hereof recognizes that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above should also be included within the scope of computer-readable media.

The memory 112 includes computer-storage media in the form of volatile and/or nonvolatile memory. The memory may be removable, nonremovable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

Figure 2:
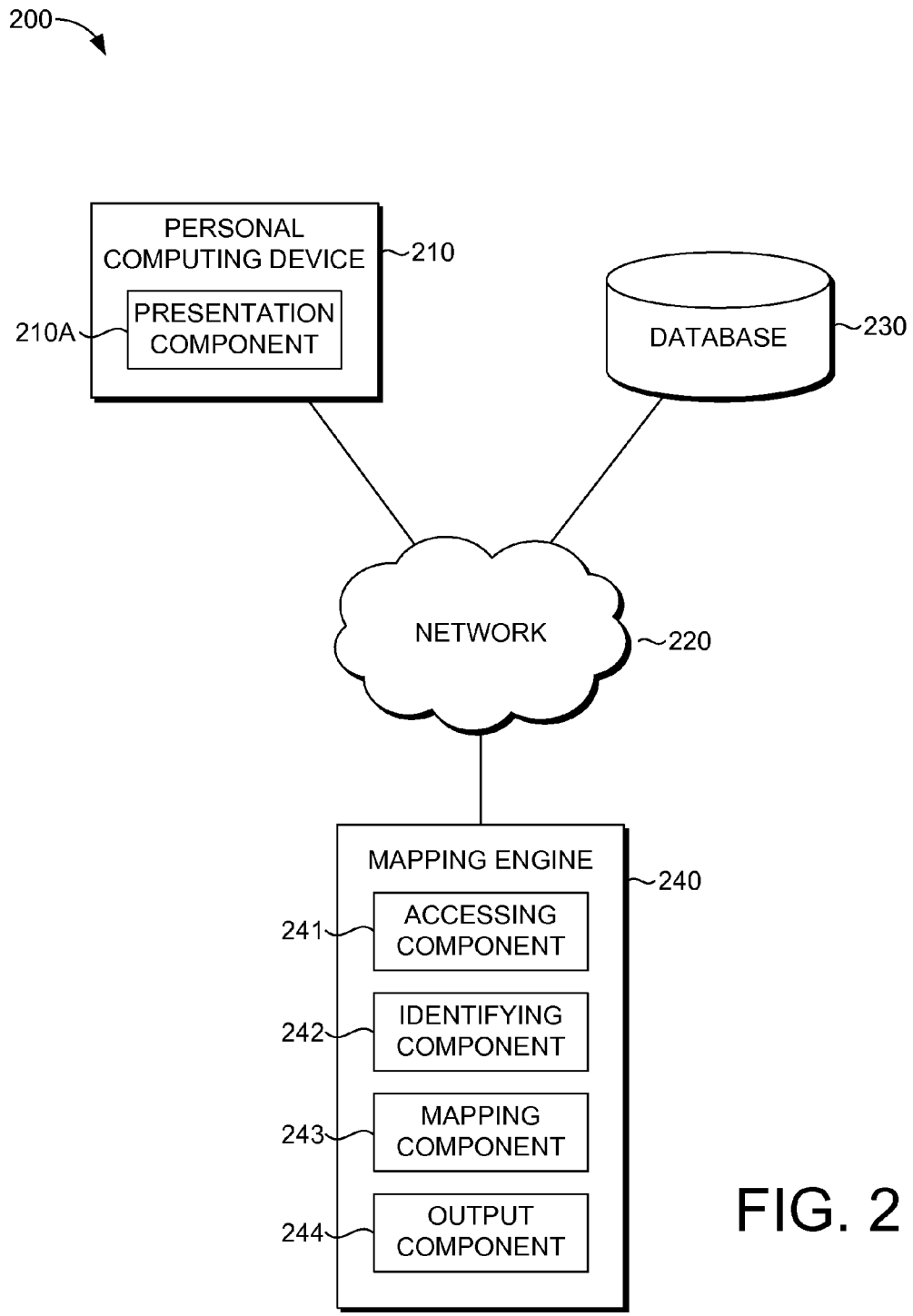
FIG. 2 is a block diagram of an exemplary computing system in which embodiments of the invention may be employed.

As indicated previously, embodiments of the present invention are directed to mapping identifiers. Referring now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the computing system 200 generally includes personal computing device 210, network 220, data storage device 230, and a mapping engine 240. The personal computing device 210 and the mapping engine 240 may each include any type of computing device, such as the computing device 100 described with reference to FIG. 1, for example. The components of the computing system 200 may communicate with each other via a network (e.g., network 220), which may include, without limitation, one or more local area networks (LANs) and/or wide area networks (WANs). Such networking environments are commonplace in offices, enterprise-wide computer networks, intranets and the Internet. It should be understood that any number of personal computing devices and network devices may be employed in the computing system 200 within the scope of embodiments of the present invention. Additionally, other components not shown may also be included within the computing system 200.

The computing system 200 typically includes, or has access to, a variety of computer-readable media. By way of example, and not limitation, computer-readable media may include computer-storage media and communication media. In general, communication media enables each server to exchange data via a network, e.g., network 220. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

In some embodiments, one or more of the illustrated components/modules may be implemented as stand-alone applications. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the mapping engine 240 might reside on a server, a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Generally, the computing system 200 illustrates an environment in which any identifier may be mapped to any other identifier. For example, unregistered identifiers may be mapped to registered identifiers and any information associated therewith, unregistered identifiers may be mapped to other unregistered identifiers, registered identifiers may be mapped to other registered identifiers, or the like. An identifier, whether it is a registered identifier or an unregistered identifier, as used herein, refers generally to an association between an activity log event and an entity associated with an activity. An activity log event, as used herein, generally refers to any activity that may be captured in an activity event log including, but not limited to, a search query input, a browsing session, a page-view, a selection of an item within a page-view, or the like.

When an entity associated with the activity log event is known, the identifier may be referred to as a registered identifier. For example, a computing device may be registered to a specific user. Thus, the identifier that identifies the computing device is a registered identifier and is associated with any available information related to the specific user. A password identifier is a further example of a registered identifier. Password identifiers, as used herein, generally refer to an identifier that is associated with a specific user and is validated by a set of credentials (e.g., a username and password). For instance, an MSN Passport and a Windows Live ID are both examples of password identifiers. Thus, registered identifiers including password identifiers, device identifiers, or the like may be recognized by the present invention.

When an entity associated with the activity log event is not known, the identifier may be referred to as an unregistered identifier. For example, cookie identifiers may be randomly assigned to various activities (e.g., browsing sessions) and do not contain any identifying information. Thus, while an identifier is associated with the activity, the cookie identifier, as an unregistered identifier, is not associated with any identifying information. Any activity log event criteria and/or preferences are generally pre-configured by an advertiser, an internet service provider, and/or any other entity. Once entered, such information may be stored in association with the data storage device 230.

The data storage device 230 is configured to store information associated with activity log event criteria, activity log event output, search and browse sessions, content preferences, activity log events (e.g., search queries), identifiers, user profiles, and the like. In various embodiments, such information may include, without limitation, user profile data, registered identifiers, unregistered identifiers, and the like. In embodiments, the data storage device 230 is configured to be searchable for one or more of the items stored in association therewith. It will be understood and appreciated by those of ordinary skill in the art that the information stored in association with the data storage device 230 may be configurable and may include any information relevant to one or more search and browse sessions, content preferences, identifiers, and/or the like. The content and volume of such information are not intended to limit the scope of embodiments of the present invention in any way. Further, though illustrated as a single, independent component, the data storage device 230 may, in fact, be a plurality of storage devices, for instance a database cluster, portions of which may reside on the network 220, the personal computing device 210, another external computing device (not shown), and/or any combination thereof.

With continued reference to FIG. 2, the personal computing device 210 includes a presentation component 210A configured to present a user input region used to, for example, input recognized activities resulting in activity logs. The presentation component 210A is further configured to present customized advertisements to the user, as will be discussed in detail below. Further, the functionality described herein as being performed by the presentation component 210A may be performed by any other application capable of rendering web content. Any and all such variations, and any combination thereof, are contemplated to be within the scope of embodiments of the present invention.

The mapping engine 240 includes an accessing component 241, an identifying component 242, a mapping component 243, and an output component 244. The accessing component 241 is configured to access (e.g., receive, extract, etc.) activity logs illustrating a plurality of activities/events for a plurality of identifiers. The accessing component 241 may access the activity logs, for example, from the data storage device 230.

The activity logs typically include various activities, or events, that have been recognized and may be referred to herein as log schema. The log schema may automatically be translated to any recognized job script. Activity criteria may be established by an internet service provider, an advertiser, or any other entity that may record activity logs. Exemplary activities may include, but are not limited to, a search query input, a browsing session, a page-view, a selection of an item within a page-view, or the like. Along with criteria for the recognition of activities, criteria may also be established for organizing activities within the log. For example, each event may be designated on a different line of the activity log, identifiers with similar properties may be designated on the same line of the activity log, events that are the same may be designated on the same line, or the like.

The activity log may include registered or unregistered identifiers associated with each event within the activity log. Identifiers may be associated with more than one event. For instance, a registered identifier A may be associated with a browse session of User A and a search input of User A. Both the browse session and the search event may be recognized as different events but are associated with the same User A. Thus, the registered identifier may be the same for each event. Alternatively, the same User A may be associated with a different identifier, either registered or unregistered. For instance, User A may have more than one MSN passport account and may sign in using a second password identifier. Thus, the two events would be associated with two different registered identifiers belonging to the same user.

The identifiers, whether registered identifiers or unregistered identifiers, may be associated with configurations detailing properties of each identifier. Exemplary properties include, but are not limited to, a lifetime of the identifier, a source of the identifier, or the like. For instance, an identifier may be associated with a configuration that indicates the lifetime of the identifier has been one year.

The identifying component 242 of the mapping engine 240 is configured to identify the identifiers that are included in the accessed activity log. In embodiments, the activity log may include a single type of identifier or multiple types of identifiers. For example, an identifier may be a device identifier, a password identifier, or any other type of identifier that is recognized. When an activity log includes a single type of identifier (e.g., all identifiers in the activity log may be password identifiers) then the mapping engine 240 is configured to identify the type of identifier and group all of the identifiers together. For instance, assume the following is an activity log that is accessed by the mapping engine 240:

EXAMPLE 1

Line 1: A1, A2
Line 2: A2, A3
Line 3: A3, A4

The type of identifier (e.g., password, device, etc.) is designated by the "A" in the above example 1. Thus, each identifier is assumed to be Type A. In embodiments, a single line of the activity log includes at least two identifiers. For the purposes of this example, assume that line 1 includes two identifiers illustrated as A1 and A2. For example, A1 may be a first identifier and A2 may be a second identifier. The identifying component 242 is configured to identify that two identifiers are on the same line of an activity log. When two identifiers are on the same line of an activity log, it may be assumed that the identifiers are generated from the same event related to a single user.

The identifying component 242 is configured to identify linking attributes of identifiers. A linking attribute is an attribute that is common to multiple identifiers and is used to map the identifiers sharing the linking attribute to one another. Examples of linking attributes include, but are not limited to, identifiers positioned on the same line of an activity log, identifiers appearing in the same browser session, identifiers that are associated with the same user, identifiers that are associated with the same IP address, or the like.

When a linking attribute is identified, the mapping component 243 may proceed with mapping, or correlating, the identifiers sharing the linking attribute to one another. The identifiers sharing the linking attribute may both be registered identifiers, unregistered identifiers, or one may be a registered identifier while the other is an unregistered identifier. The mapping component 243 is configured to map any identifier to any other identifier by grouping the identifiers into correlation output lines.

In Example 1, assume that A1 and A2 are a first registered password identifier to user 1 and a second registered password identifier to user 1, respectively. Both password identifiers are identified as sharing a linking attribute (e.g., both are associated with user 1). Thus, the two registered identifiers are mapped to one another and any user profile information and/or behavior information associated with each of A1 and A2 are, in turn, associated with both A1 and A2.

Assuming that A1, of Example 1, is a registered password identifier and A2 is an unregistered identifier, the identifying component may identify that A1 and A2 share a linking attribute (e.g., both are included on line 1 of the activity log). The two identifiers may then be mapped to one another. Once identified as sharing a linking attribute, the mapping component 243 may map A1 and A2 to one another.

A subsequent line of the activity log may then be analyzed to identify any identifiers that include a linking attribute with any identifiers of Line 1. If a subsequent line includes at least one identifier having a linking attribute with at least one identifier of the previous line, the mapping component 243 is configured to combine the identifiers one line at a time. For example, assume that A2 and A3 share a linking attribute. In that situation, lines 1 and 2 are combined to output A1, A2, A3 as a first correlation output line, or a first resulting line.

The resulting line may be combined with Line 3 to output A1, A2, A3, A4 as the second resulting line if Line 3 includes at least one identifier sharing a linking attribute with at least one identifier from the resulting line. Additionally, resulting lines may be combined with subsequent lines when there is at least one merging identifier or an overlapping identifier. For instance, the first resulting line and Line 3 each included A3. A3 is, in turn, recognized as an overlapping identifier. The combinations may continue until the last line of the activity log is combined.

When an activity log includes multiple types of identifiers in a single line, the mapping engine 240 is configured to identify each type of identifier and combine the identifiers one line at a time and one identifier type at a time when there are at least two identifiers in the activity event line. For example, assume the below activity log is accessed by the mapping engine 240 and that A1 and A2 are registered identifiers to the same user:

EXAMPLE 2

Line 1: A1, A2; B1, B2
Line 2: A1, A3; B3, B4
Line 3: A5, A6; B3

Example 2 illustrates Type A and Type B identifiers included in a single line of an activity log. Initially, a determination is made whether the initial lines have an overlapping identifier. If there is an overlapping identifier, the two lines may be merged. In this case, both Lines 1 and 2 include A1. A1 is, thus, the overlapping identifier. If there is no overlapping identifier, the two lines are not immediately merged. The two lines may still be merged together if, for example, one identifier from each line shares a linking attribute.

Based on a determination that Lines 1 and 2 include an overlapping identifier, Lines 1 and 2 are combined based on identifier type. Accordingly, type A is combined first and type B is combined second. Assuming that Line 1 includes two registered identifiers (i.e., A1 and A2), the identifying component 242 identifies that any unregistered identifiers in that activity line (i.e., Line 1) may be mapped to the registered identifiers by the mapping component 243. Alternatively, if Line 1 included only registered identifiers or only unregistered identifiers, all of the identifiers included in Line 1 may still be mapped to one another by the mapping component 243 if a linking attribute is identified.

When Lines 1 and 2 are combined the combination of Type A identifiers results as A1, A2, A3 and the combination of Type B identifiers results as B1, B2, B3, B4. Thus, the resulting first output line is A1, A2, A3; B1, B2, B3, B4 illustrating the combination of the Type A identifiers and then the combination of the Type B identifiers.

Next, the mapping engine 240 determines if the first output line and the subsequent activity line include an overlapping identifier utilizing, for example, the identifying component 242. In Example 2, the first output line and Line 3 are identified by the identifying component 242 as both including B3. The first output line is then combined with Line 3. Again, the Type A identifiers are combined initially and is followed by the combination of Type B identifiers or vice versa. Accordingly, the combination of the Type A identifiers is A1, A2, A3, A5, A6 and the combination of the Type B identifiers is B1, B2, B3, B4. Thus, the resulting second output line is A1, A2, A3, A5, A6; B1, B2, B3, B4. The combinations may continue until the last line of the activity log is reached.

In embodiments, the identifying component 242 may identify if a linking attribute is present as an alternative, or in addition, to an overlapping identifier. Thus, even if there is no overlapping identifier, the subsequent line may still be merged into the preceding or resulting line if at least one identifier from each line shares a linking attribute.

Once the identifiers are mapped and combined into a correlated output line, the output component 244 outputs the correlated output line. The correlated output may be displayed via a computing device similar to computing device 100 of FIG. 1, presentation component 210A of the personal computing device 210 of FIG. 2, or the like. In embodiments, the correlated output is automatically generated by the mapping engine 240.

Besides automatically mapping identifiers based on a location within an activity log line, embodiments of the present invention map identifiers based on alternative criteria. For example, identifiers may be mapped to any other identifier based on properties of identifiers. As mentioned previously, a lifetime of an identifier may be a property of an identifier and may also be used as a factor in the correlation of identifiers. Additionally, user properties may also be a factor in the correlation of identifiers. For instance, a user may have various identifiers across several devices such as, for example, a home computer and a mobile phone.

Once the mapping of the identifiers is complete, the output generated may be utilized to create an increased targeted audience for customized advertisements. In embodiments, the number of identifiers that are associated with user information will increase as a result of mapping identifiers. Thus, a target audience for a customized advertisement may also be larger than before the identifiers were mapped. Additionally, more information is available to generate a targeted advertisement for a target group of identifiers since information and/or behavior for each of the plurality of identifiers with the target group is available to customize the advertisement once the plurality of identifiers are mapped together.

In addition to a potential increase in a targeted advertisement audience, mapping identifiers may also aid in web monitoring. For example, MSN may monitor the number of visitors to the website. Assuming that an individual has more than one MSN account, the same individual may be counted twice for a different account access. By mapping duplicate identifiers to one another, a single user may only be counted one time and, thus, a more accurate count may be obtained.

Figure 3:
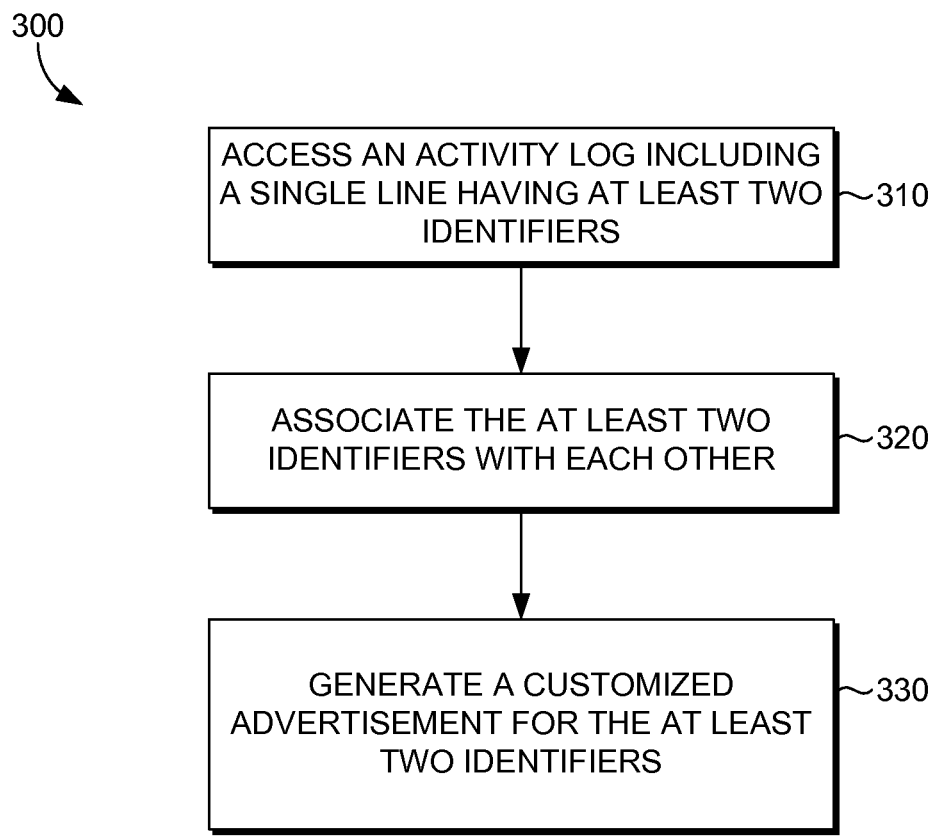
FIG. 3 is a flow diagram showing a first method for mapping identifiers, in accordance with an embodiment of the present invention.

Turning now to FIG. 3, a flow diagram is provided that illustrates a method 300 for mapping identifiers, in accordance with an embodiment of the present invention. As indicated at block 310, an activity log is accessed that includes a single line having at least two identifiers. The at least two identifiers may be registered identifiers, unregistered identifiers, or a combination thereof. At block 320, the at least two identifiers are associated with each other. A customized advertisement for the at least two identifiers is generated at block 330.

Figure 4:
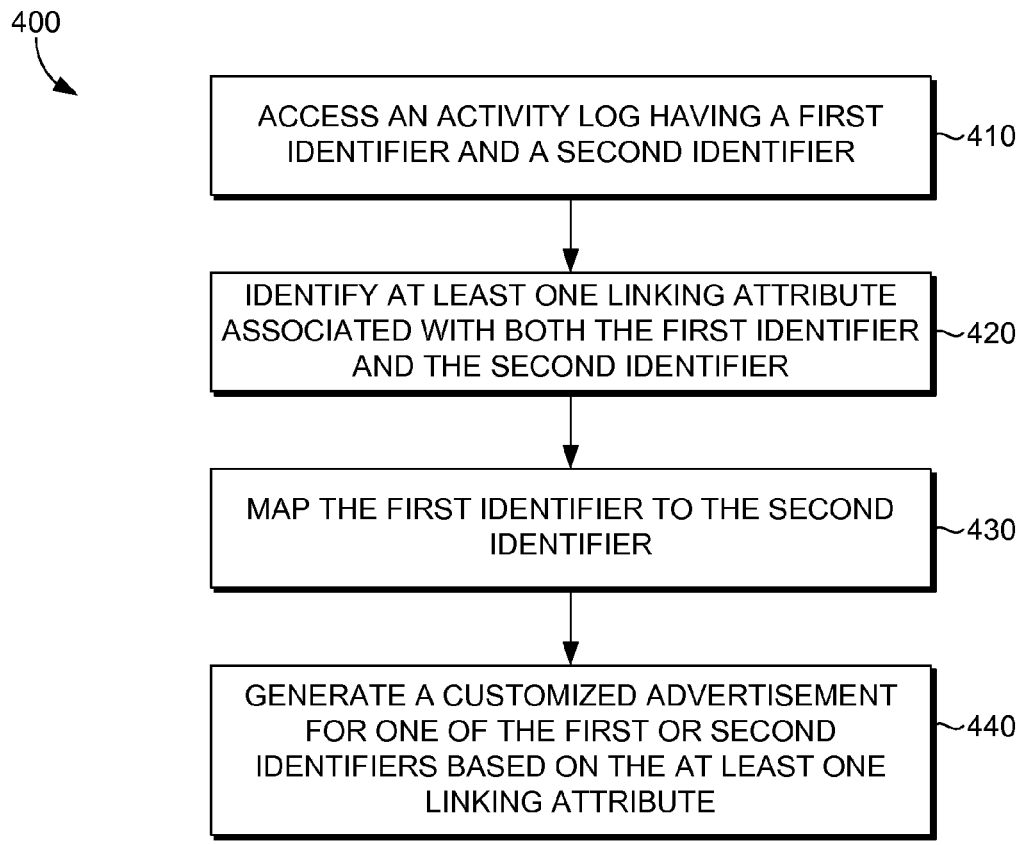
FIG. 4 is a flow diagram showing a second method for mapping identifiers, in accordance with another embodiment of the present invention.

With reference to FIG. 4, a flow diagram is provided that illustrates a method 400 for mapping identifiers, in accordance with another embodiment of the present invention. As indicated at block 410, an activity log is accessed that includes a first identifier and a second identifier. As indicated at block 420, at least one linked attribute associated with each of the first identifier and the second identifier is identified. The first identifier is mapped to the second identifier at block 430. A customized advertisement is generated at block 440 for one of the first or second identifiers based on the at least one linked attribute.

As can be understood, embodiments of the present invention provide systems and methods for mapping identifiers. Activity logs may be received that illustrate a plurality of activities/events for a plurality of identifiers. The identifiers may be registered identifiers, unregistered identifiers, or a combination thereof. When an activity log includes a combination of registered identifiers and unregistered identifiers, the unregistered identifiers may be mapped to unregistered identifiers, registered identifiers along with information associated therewith, or the like. For example, user profile information or user behavior associated with a registered identifier may be associated with an unregistered identifier when the unregistered identifier is mapped to the registered identifier. Registered identifiers may also be mapped to other registered identifiers to enrich a user profile.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3 and the method 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media comprising hardware storing computer-useable instructions that, when used by one or more computing devices, cause the one or more computing devices to perform a method for mapping identifiers, the method comprising:
 accessing an activity log including a first single line having at least two identifiers, wherein each of the at least two identifiers represents an association between an activity log event and an entity associated with the activity log event;
 associating the at least two identifiers with each other;
 identifying at least one of the at least two identifiers in a subsequent line of the activity log as well as at least one additional identifier;
 merging the subsequent line with the first single line to create an output line including each of the at least two identifiers and the at least one additional identifier; and
 generating a customized advertisement for the at least two identifiers and the at least one additional identifier utilizing the output line created when the first single line and the subsequent line were merged together.

2. The one or more computer-readable storage media of claim 1, further comprising instructions for:
 presenting the customized advertisement in association with an event of at least one of the identifiers, wherein the event is a browsing session.

3. The one or more computer-readable storage media of claim 1, wherein generating a customized advertisement comprises:
 identifying at least one linking attribute of the at least two identifiers; and
 customizing the advertisement for the at least two identifiers based on the at least one linking attribute.

4. The one or more computer-readable storage media of claim 3, further comprising instructions for:
 accessing a second line of the activity log including a third identifier that is associated with the at least one linking attribute of the at least two identifiers.

5. The one or more computer-readable storage media of claim 4, further comprising instructions for:
 mapping the third identifier to the at least two identifiers.

6. The one or more computer-readable storage media of claim 1, wherein at least one of the identifiers is a registered identifier.

7. The one or more computer-readable storage media of claim 1, wherein at least one of the identifiers is an unregistered identifier.

8. An identifier mapping system, comprising:
 a computing device associated with one or more processors and one or more computer-readable storage media;
 a data store coupled with the computing device;
 a mapping engine that maps at least two identifiers on a single line of an activity log to each other, wherein each of the at least two identifiers represents an association between an activity log event and an entity associated with the activity log event; and
 an advertising engine that generates customized advertisements for the at least two identifiers, wherein the advertising engine generates customized advertisements based on an output line created by merging together at least two lines that include an overlapping identifier such that the customized advertisement is generated for each identifier included in the output line.

9. The identifier mapping system of claim 8, wherein at least one of the identifiers is a registered identifier.

10. The identifier mapping system of claim 8, wherein at least one of the identifiers is an unregistered identifier.

11. One or more computer-readable storage media comprising hardware storing computer-useable instructions that, when used by one or more computing devices, cause the one or more computing devices to perform a method for mapping identifiers, the method comprising:
 accessing an activity log including a first identifier and a second identifier;
 identifying both a lifetime of the first and second identifiers and at least one linking attribute associated with both the first identifier and the second identifier;
 based on the lifetime of the first and second identifiers and the at least one linking attribute, mapping the first identifier to the second identifier;
 determining whether at least one overlapping identifier is included in both a preceding line and a subsequent line of the activity log;
 based upon a determination that the at least one overlapping identifier is included in both the preceding line and the subsequent line of the activity log, merging the preceding line and the subsequent line of the activity log to create an output line; and
 utilizing the output line, generating a customized advertisement for the first and second identifiers based on the at least one linked attribute such that the output line increases a size of a target audience that includes both the first and second identifiers.

12. The one or more computer-readable storage media of claim 11, wherein the first identifier and the second identifier are both unregistered identifiers.

13. The one or more computer-readable storage media of claim 11, wherein the first identifier and the second identifier are both registered identifiers.

14. The one or more computer-readable storage media of claim 11, wherein the method further comprises:
 identifying a third identifier that is associated with a second linking attribute common to both the third identifier and the second identifier.

15. The one or more computer-readable storage media of claim 14, wherein the method further comprises mapping the second identifier to the third identifier.

16. The one or more computer-readable storage media of claim 15, wherein the second identifier is a registered identifier and the third identifier and is an unregistered identifier.

17. The one or more computer-readable storage storage media of claim 11, wherein the at least one linking attribute is that both the first identifier and second identifier are both included in a single line of the activity log.

* * * * *